US009064354B2

(12) United States Patent
Shiraishi et al.

(10) Patent No.: US 9,064,354 B2
(45) Date of Patent: Jun. 23, 2015

(54) AUTHENTICATION REGISTRATION AND CANCELLATION DEVICE

(71) Applicant: OPTEX CO., LTD., Shiga (JP)

(72) Inventors: Masanao Shiraishi, Shiga (JP); Mitsugu Mihara, Shiga (JP); Hiroyuki Ohba, Shiga (JP); Takeshi Kawahara, Osaka (JP); Yasuhiro Hosaki, Osaka (JP); Satoshi Sogabe, Osaka (JP); Tomoki Kaneyama, Osaka (JP); Tomoya Masuyama, Osaka (JP); Kazuo Komiyama, Osaka (JP)

(73) Assignee: OPTEX CO., LTD., Shiga (JP)

( * ) Notice: Subject to any disclaimer, the term of this patent is extended or adjusted under 35 U.S.C. 154(b) by 0 days.

(21) Appl. No.: 14/261,852

(22) Filed: Apr. 25, 2014

(65) Prior Publication Data

US 2014/0339305 A1 Nov. 20, 2014

(30) Foreign Application Priority Data

May 2, 2013 (JP) ................................ 2013-096764

(51) Int. Cl.
*G06K 5/00* (2006.01)
*G07C 9/00* (2006.01)

(52) U.S. Cl.
CPC ........ *G07C 9/00103* (2013.01); *G07C 2209/02* (2013.01)

(58) Field of Classification Search
USPC .............................. 235/380, 382, 382.5, 375
IPC .................... G07F 7/1008; G06Q 20/341,30/02
See application file for complete search history.

(56) References Cited

U.S. PATENT DOCUMENTS

2005/0116024 A1* 6/2005 Beenau et al. ................ 235/380
2007/0120651 A1* 5/2007 Kobayashi et al. ........ 340/10.51
2012/0268239 A1 10/2012 Ljung et al.

FOREIGN PATENT DOCUMENTS

| | | | |
|---|---|---|---|
| JP | 2683379 | B2 | 11/1997 |
| JP | 2007-213334 | A | 8/2007 |
| JP | 3144030 | U | 7/2008 |
| KR | 2011-0076228 | A | 7/2011 |

OTHER PUBLICATIONS

The Search Report under Section 17(5) issued by the British Intellectual Property Office on Oct. 23, 2014, which corresponds to British Patent Application No. GB1407612.9 and is related to U.S. Appl. No. 14/261,852.

* cited by examiner

*Primary Examiner* — Karl D Frech
(74) *Attorney, Agent, or Firm* — Studebaker & Brackett PC

(57) ABSTRACT

An authentication registration/invalidation apparatus is provided, which allows easy invalidation of an authentication tag when the authentication tag is lost, and facilitates management of authentication tags. When an RFID reader (2) receives an RFID signal including an instruction of invalidation, which is transmitted from an operation tag (10*b*) in a recognition area (A), an invalidation unit (32*b*) sets an operation mode to an invalidation enabled mode. If an RFID tag recognizer (31*a*) recognizes an authentication tag (10*a*) before or after the setting of the invalidation enabled mode, the invalidation unit 32*b* invalidates the authentication tag (10*a*), or invalidates all authentication tags (10*a*) that belong to a group to which the authentication tag belongs.

10 Claims, 10 Drawing Sheets

(a)

| | |
|---|---|
| TAG 21 | EXISTING GROUP II |

(b)

| | |
|---|---|
| TAG 21 | EXISTING GROUP II |
| TAG 22 | EXISTING GROUP II |

(c)

| | |
|---|---|
| TAG 21 | EXISTING GROUP II |
| TAG 22 | EXISTING GROUP II |
| TAG 23 | EXISTING GROUP II |

(a)

| | |
|---|---|
| TAG 41 | EXISTING GROUP VI |
| TAG 42 | EXISTING GROUP VII |
| TAG 43 | EXISTING GROUP VIII |

(b)

| | |
|---|---|
| TAG 41 | EXISTING GROUP VI |
| TAG 42 | EXISTING GROUP VI |
| TAG 43 | EXISTING GROUP VIII |

(c)

| | |
|---|---|
| TAG 41 | EXISTING GROUP VI |
| TAG 42 | EXISTING GROUP VI |
| TAG 43 | EXISTING GROUP VI |

(a)

| | |
|---|---|
| TAG 11 | GROUP I |
| TAG 12 | GROUP II |

(b)

| | |
|---|---|
| TAG 11 | INVALID |
| TAG 12 | GROUP II |

(c)

| | |
|---|---|
| TAG 11 | INVALID |
| TAG 12 | INVALID |

(a)

4

| | |
|---|---|
| TAG 21 | GROUP Ⅲ |
| TAG 22 (LOST) | GROUP Ⅲ |
| TAG 23 | GROUP Ⅲ |
| TAG 24 | GROUP Ⅲ |
| TAG 25 | GROUP Ⅲ |

(b)

4

| | |
|---|---|
| TAG 21 | INVALID |
| TAG 22 (LOST) | INVALID |
| TAG 23 | INVALID |
| TAG 24 | INVALID |
| TAG 25 | INVALID |

AUTHENTICATION REGISTRATION AND CANCELLATION DEVICE

CROSS REFERENCE TO THE RELATED APPLICATION

This application is based on and claims Convention priority to Japanese patent application No. 2013-096764, filed May 2, 2013, the entire disclosure of which is herein incorporated by reference as a part of this application.

BACKGROUND OF THE INVENTION

1. Field of the Invention

The present invention relates to an apparatus which performs authentication registration or authentication invalidation (cancellation) of an authentication tag that is an RFID (radio frequency identification) tag used for authentication, by means of an operation tag that is an RFID tag used for an operation. It is noted that the term "authentication registration" means that an authentication tag is registered as a target to be authenticated, and may be referred to simply as "registration", hereinafter. On the other hand, "authentication invalidation (authentication cancellation)" means that registration of an authentication tag as a target to be authenticated is invalidated or cancelled, and may be referred to simply as "invalidation" hereinafter.

2. Description of Related Art

Conventionally, an IC card having a built-in RFID tag is used for authentication. As a method for authentication registration and/or authentication invalidation of the RFID tag, a method of performing a predetermined operation by using a registration card and/or a cancellation (invalidation) card is known (Japanese Patent No. 2683379, for example). The operation for authentication registration and/or authentication invalidation needs not only the registration card and/or the cancellation card but also an RFID tag that is a target of the authentication registration and/or the authentication invalidation.

However, in this case, if the IC card is lost, the RFID tag built in the IC card cannot be invalidated. In contrast, in Japanese Utility Model Registration No. 3144030, a management IC card paired with a registration united IC card or a management IC card grouped with a plurality of registered IC cards is prepared and retained by an administrator of the system. If a registration united IC card is lost, invalidation is performed by using the management IC card.

However, in the case where a management IC card is provided for each registered IC card or for each group of registered IC cards, if the number of IC cards or the number of groups of IC cards is great, the number of management IC cards becomes huge. As a result, management of these management IC cards is complicated, and the cost associated with the management is increased. In addition, since the administrator should manage a large number of management IC cards, the administrator might use an improper management IC card by mistake. Further, when an IC card belongs to a plurality of groups, it is difficult to cancel belonging of the IC card to a certain group among the plurality of groups. Therefore, usually, belonging of the IC card to all the groups is canceled by invalidation. In order to make the IC card belong to a desired group again, complicated management is needed.

An object of the present invention is to provide an authentication registration/invalidation apparatus which allows easy invalidation of an authentication tag when the authentication tag is lost, and facilitates management of authentication tags.

SUMMARY OF THE INVENTION

In order to achieve the above-described object, an authentication registration/invalidation apparatus according to an aspect of the present invention is an apparatus which, using RFID tags including an authentication tag and an operation tag, performs authentication registration or authentication invalidation on the authentication tag by means of the operation tag. The apparatus includes an operation mode storage unit, an RFID reader, an RFID tag recognizer, a registration unit and an invalidation unit. The operation mode storage unit stores therein an operation mode that is set to a registration enabled mode or an invalidation enabled mode. The RFID reader is associated with a recognition area, and receives signals transmitted from one or more RFID tags located in the recognition area. The RFID tag recognizer recognizes the one or more RFID tags located in the recognition area, based on the signals received by the RFID reader. The registration unit operates as follows. When the RFID reader receives an RFID signal including a registration instruction, which is transmitted from an operation tag located in the recognition area, and then if the operation mode is not set to the registration enabled mode, the registration unit sets the operation mode to the registration enabled mode. While the operation mode is the registration enabled mode after the setting of the registration enabled mode, when the RFID tag recognizer recognizes at least one first authentication tag, the registration unit regards the at least one first authentication tag as an operation target so as to make the at least one first authentication tag belong to a certain group by registering it. The invalidation unit operates as follows. When the RFID reader receives an RFID signal including an invalidation instruction, which is transmitted from the operation tag located in the recognition area, and then if the operation mode is not set to the invalidation enabled mode, the invalidation unit sets the operation mode to the invalidation enabled mode. Before or at the time of the setting of the invalidation enabled mode, or after the setting of the invalidation enabled mode and while the operation mode is the invalidation enabled mode, if the RFID tag recognizer recognizes at least one second authentication tag, the invalidation unit invalidates the at least one second authentication tag or invalidates all authentication tags that belong to a group to which the at least one second authentication tag belongs.

An "authentication tag" and an "operation tag" each may include, in an RFID signal transmitted therefrom, an identifier indicating that the tag is an authentication tag or an operation tag. The identifier allows the RFID reader to determine, based on the received RFID signal, which of an authentication tag and an operation tag transmits the RFID signal.

A term "group" can be arbitrarily set, and may be set according to an application in which an authentication tag is used. Examples of groups are as follows. In a company, a department may correspond to a group. In an apartment building, each apartment (a unit of rental or purchase) may correspond to a group. When a group is a department, employees corresponding to members of the department carry IC cards having built-in authentication tags that belong to the same group. When a group is an apartment, persons (housemates) living in the same apartment carry IC cards having built-in authentication tags that belong to the same group.

A term "registration instruction" and an "invalidation instruction" may be included in an RFID signal transmitted from a single operation tag such that the RFID signal is switched between the registration instruction and the invalidation instruction. Alternatively, an operation tag for registration and an operation tag for invalidation may be individually provided.

A wording "before or at the time of setting of the invalidation enabled mode" corresponds to a time period from a certain time point to a time point at which the invalidation enabled mode is set, and includes the time point at which the mode is set. On the other hand, "after setting of the registration enabled mode" and "after setting of the invalidation enabled mode" each correspond to a time period from immediately after a time point at which each mode is set to a time point at which the mode is terminated. In particular, in a case where each RFID tag is a semi-active type or active type tag, which has a built-in battery, and the RFID reader is configured to be able to simultaneously receive RFID signals from an authentication tag and an operation tag, the above-mentioned "before or at the time of setting of the invalidation enabled mode" is preferably limited to "at the time of setting of the invalidation enabled mode". On the other hand, when each RFID tag is a passive type tag, which has no built-in battery, the RFID reader cannot simultaneously receive RFID signals from an authentication tag and an operation tag. Therefore, in this case, the above-mentioned "before or at the time of setting of the invalidation enabled mode" is preferably limited to "before setting of the invalidation enabled mode". Even when the RFID tag recognizer instantaneously recognizes an authentication tag during a time period from a first time point a predetermined period before a second time point at which the mode is set, to the second time point at which the mode is set, it is regarded that the RFID tag recognizer recognizes the authentication tag "before setting of the invalidation enabled mode".

The registration unit's "making an authentication tag belong to a certain group" includes four cases as follows: a case where an unregistered authentication tag is registered so as to belong to a new group; a case where an unregistered authentication tag is registered so as to belong to an existing group; a case where an already-registered authentication tag is re-registered so as to belong to a new group different from a group to which the tag belongs; and a case where an already-registered authentication tag is re-registered so as to belong to an existing group different from a group to which the tag belongs. Here, "unregistered" means "unregistered for authentication", and "already registered" means "already registered for authentication".

According to the above configuration, since the registration unit does not make an authentication tag belong to a plurality of groups but makes an authentication tag belong to only a certain group, the authentication tag registered for authentication necessarily corresponds to the group in a one-to-one manner, and therefore, an administrator can easily grasp the correspondence relationship between the authentication tag and the group. If an authentication tag belongs to a plurality of groups, the administrator needs to confirm the correspondence relationship between the authentication tag and the groups, which is displayed on a display of a personal computer, for example. With the above configuration, however, such display is not necessary because an authentication tag belongs to only one group.

Since an authentication tag necessarily belongs to one group when being registered, if an IC card having a built-in authentication tag is lost, all authentication tags that belong to a group to which the lost authentication tag belongs are invalidated, whereby the lost authentication tag can be easily invalidated. It is noted that, in preparation for loss of an IC card, preferably, two or more authentication tags belong to each group.

Further, the operation mode is set to the registration enabled mode or the invalidation enabled mode in accordance with an instruction from the operation tag. In the registration enabled mode, a recognized authentication tag is made to belong to a group. In the invalidation enabled mode, a recognized authentication tag is invalidated or all authentication tags that belong to a group to which the authentication tag belongs are invalidated. Therefore, one operation tag is enough to be provided for the authentication registration/invalidation apparatus, and operation tags corresponding to the respective groups are not necessary. Accordingly, management of the operation tag is not complicated.

In a preferred embodiment, whether the invalidation unit invalidates the at least one second authentication tag or all the authentication tags that belong to the group to which the at least one second authentication tag belongs, depends on whether the at least one second authentication tag is recognized by the RFID tag recognizer before or at the time of the setting of the invalidation enabled mode, or after the setting of the invalidation enabled mode and while the operation mode is the invalidation enabled mode.

As described above, the authentication tag to be invalidated varies depending on whether the authentication tag is recognized before or at the time of the setting of the invalidation enabled mode, or after the setting thereof. Therefore, the authentication registration/invalidation apparatus can deal with various invalidations by only changing the order of the setting of the invalidation enabled mode and the recognition of the authentication tag. Accordingly, as long as a single operation tag can transmit an RFID signal including an invalidation instruction, both invalidation of one authentication tag and invalidation of all authentication tags that belong to a group can be performed. In addition, the single operation tag may be a single operation tag that can transmit both an RFID signal including a registration instruction and an RFID signal including an invalidation instruction. Alternatively, the single operation tag may be composed of a single operation tag for instructing registration and a single operation tag for instruction invalidation.

In a preferred embodiment, depending on whether or not the first already-registered authentication tag different from authentication tag(s) that is to be registered as the operation target is recognized by the RFID tag recognizer before or at the time of the setting of the registration enabled mode, the certain group to which, by the registration unit, the authentication tag(s) that is to be registered as the operation target is made to belong is either a group to which the first already-registered authentication tag belongs, or a new group.

Here, a wording "before or at the time of setting of the registration enabled mode" corresponds to a time period from a certain time point to a time point at which the mode is set, and includes the time point at which the mode is set. In particular, in a case where each RFID tag is a semi-active type or active type tag, which has a built-in battery, and the RFID reader is configured to be able to simultaneously receive RFID signals from an authentication tag and an operation tag, the above-mentioned "before or at the time of setting of the registration enabled mode" is preferably limited to "at the time of setting of the registration enabled mode". On the other hand, when each RFID tag is a passive type tag, which has no built-in battery, the RFID reader cannot simultaneously receive RFID signals from an authentication tag and an operation tag. Therefore, in this case, the above-mentioned "before or at the time of setting of the registration enabled mode" is preferably limited to "before setting of the registration enabled mode". Even when the RFID tag recognizer instantaneously recognizes an authentication tag during a time period from a first time point a predetermined period before a second time point at which the mode is set, to the second time point at which the mode is set, it is regarded that the RFID tag recognizer recognizes the authentication tag "before setting of the invalidation enabled mode".

As described above, the group to which an authentication tag belongs varies depending on whether the first already-registered authentication tag different from authentication tag(s) that is to be registered as the operation target is recognized before or at the time of setting of the registration enabled mode. Therefore, the authentication registration/invalidation apparatus can deal with various registrations depending on whether there is the first already-registered authentication tag. Accordingly, as long as a single operation tag can transmit an RFID signal including a registration instruction, an authentication tag can be made to belong to a different group.

In the case where the operation mode is set to the registration enabled mode or the invalidation enabled mode, the setting of the operation mode at the registration enabled mode or the invalidation enabled mode may be canceled or terminated when the registration instruction or the invalidation instruction disappears or is eliminated from the RFID signal that is periodically transmitted from the operation tag in the recognition area. Alternatively, the setting of the registration enabled mode or the invalidation enabled mode may be canceled or terminated after a predetermined time has elapsed from when the operation mode was set to the mode.

According to another preferred embodiment, when the RFID tag recognizer recognizes at least one second already-registered authentication tag before or at the time of the setting of the invalidation enabled mode, the invalidation unit invalidates all authentication tags that belong to a group to which the at least one second already-registered authentication tag belongs. When the RFID tag recognizer recognizes the at least one second already-registered authentication tag after the setting of the invalidation enabled mode and while the operation mode is the invalidation enabled mode, the invalidation unit invalidates the at least one second already-registered authentication tag.

As described above, when at least one second already-registered authentication tag is recognized before or at the time of setting of the invalidation enabled mode, all authentication tags that belong to a group to which the at least one second already-registered authentication tag belongs are invalidated. Therefore, even when an authentication tag is lost, all authentication tags that belong to the same group as the lost authentication tag are temporarily invalidated by using an authentication tag that belongs to the group, and thereafter, the invalidated authentication tags other than the lost tag are registered to as to belong to the same group, whereby only the lost authentication tag can be easily invalidated. Not only when an authentication tag is lost but also when a carrier of an already-registered authentication tag is absent, the already-registered authentication tag can be invalidated in a similar manner without using the tag. On the other hand, when an already-registered authentication tag is recognized after setting of the invalidation enabled mode and during the invalidation enabled mode, only the already-registered authentication tag is invalidated. That is, it is possible to invalidate an authentication tag with or without it.

In a still preferred embodiment, if the RFID tag recognizer does not recognize the first already-registered authentication tag before or at the time of the setting of the registration enabled mode, and when the RFID tag recognizer recognizes at least one first unregistered authentication tag that is regarded as the operation target, the registration unit makes the at least one first unregistered authentication tag belong to a new group. If the RFID tag recognizer recognizes the first already-registered authentication tag before or at the time of the setting of the registration enabled mode, and when the RFID tag recognizer recognizes at least one second unregistered authentication tag that is regarded as the operation target, the registration unit makes the at least one second unregistered authentication tag belong to a group to which the first already-registered authentication tag belongs. If the RFID tag recognizer does not recognize the first already-registered authentication tag before or at the time of the setting of the registration enabled mode, and when the RFID tag recognizer recognizes at least one third already-registered authentication tag that is regarded as the operation target, the registration unit cancels belonging of the at least one third already-registered authentication tag to a group to which the tag belongs at that time, and makes the at least one third already-registered authentication tag belong to a new group. If the RFID tag recognizer recognizes the first already-registered authentication tag before or at the time of the setting of the registration enabled mode, and when the RFID tag recognizer recognizes at least one fourth already-registered authentication tag that is regarded as the operation target, the registration unit cancels belonging of the at least one fourth already-registered authentication tag to a group to which the tag belongs to at that time, and makes the at least one fourth already-registered authentication tag belong to a group to which the first already-registered authentication tag belongs.

According to the above configuration, in order to make an authentication tag belong to an existing group regardless of whether the tag is an unregistered authentication tag or an already-registered authentication tag, the first already-registered authentication tag that belongs to the group is simply caused to be recognized before or at the time of setting of the registration enabled mode. Accordingly, it is possible to make an authentication tag belong to an existing group by a simple operation. On the other hand, if the first already-registered authentication tag is not recognized before or at the time of setting of the registration enabled mode, an authentication tag is made to belong to a new group regardless of whether the authentication tag is an unregistered authentication tag or an already-registered authentication tag. Accordingly, it is possible to make an authentication tag belong to a new group, independently of the current registration state of the authentication tag.

More preferably, in the case where the RFID tag recognizer recognizes the first already-registered authentication tag before or at the time of the setting of the registration enabled mode, the registration unit sets the operation mode to the registration enabled mode in either a case where the first already-registered authentication tag recognized by the RFID tag recognizer before or at the time of the setting of the registration enabled mode includes only one tag or a case where the first already-registered authentication tag includes a plurality of tags that belong to the same group. If a plurality of already-registered authentication tags that belong to different groups are recognized before or at the time of setting of the registration enabled mode, it cannot be determined to which group, among the different groups, a tag recognized during the registration enabled mode should belong. Therefore, in such a case, the process of the registration unit is prevented from being performed.

More preferably, in the case where the at least one second already-registered authentication tag is recognized before or at the time of the setting of the invalidation enabled mode, the invalidation unit sets the operation mode to the invalidation enabled mode in either a case where the at least one second already-registered authentication tag includes only one tag or a case where the at least one second already-registered authentication tag includes a plurality of tags that belong to the same group. The reason is as follows. When a plurality of already-registered authentication tags that belong to different groups are recognized before or at the time of setting of the invalidation enabled mode, there is a case where one of the authentication tags is not a target of invalidation but is accidentally located in the recognition area. In contrast, according to the above configuration, it is possible to invalidate all authentication tags that belong to a group to which an already-registered authentication tag as a target of invalidation belongs, while avoiding a situation in which all authentication tags that belong to a group to which an already-registered authentication tag that is not a target of invalidation belongs are invalidated.

Preferably, the authentication registration/invalidation apparatus further includes an authentication unit, and an authentication notifier. The authentication unit determines whether or not an authentication tag, among one or more RFID tags recognized by the RFID tag recognizer, is registered for authentication, based on whether the authentication tag has been subjected to authentication registration by the registration unit or subjected to authentication invalidation by the invalidation unit. The authentication notifier, when the authentication unit determines that the authentication tag is registered for authentication, outputs the result of the determination. In other words, the authentication registration/invalidation apparatus is realized by an authentication apparatus. Accordingly, it is not necessary to provide an apparatus for authentication registration/invalidation in addition to the authentication apparatus. It is noted that execution of the processes of the authentication unit and the authentication notifier is suspended while the registration unit and the invalidation unit execute the processes, and vice versa. That is, a single apparatus is switched between an authentication registration/invalidation function and an authentication function.

Preferably, when the authentication notifier outputs the result, opening of an opening/closing unit is allowed. The opening/closing unit is an automatic or manual door or shutter, for example. Alternatively, when the authentication notifier outputs the result, a lamp may be blinked to notify the result, for example.

An authentication registration method according to an aspect of the present invention is a method of performing authentication registration on the authentication tag by means of the operation tag. The method includes: providing an operation mode storage unit configured to store an operation mode that is set to a registration enabled mode; receiving, with an RFID reader associated with a recognition area, signals transmitted from one or more RFID tags located in the recognition area; recognizing the one or more RFID tags located in the recognition area, based on the signals received by the RFID reader; when the RFID reader receives an RFID signal including a registration instruction, which is transmitted from an operation tag located in the recognition area, and then if the operation mode is not set to the registration enabled mode, setting the operation mode to the registration enabled mode; and while the operation mode is the registration enabled mode after the setting of the registration enabled mode, when at least one first authentication tag is recognized, regarding the at least one first authentication tag as an operation target so as to make the at least one first authentication tag belong to a certain group by registering the at least one first authentication tag.

An authentication invalidation method according to an aspect of the present invention is a method of, using RFID tags including an authentication tag and an operation tag, performing authentication invalidation on the authentication tag by means of the operation tag. The method includes: providing an operation mode storage unit configured to store an operation mode that is set to an invalidation enabled mode; receiving, with an RFID reader associated with a recognition area, signals transmitted from one or more RFID tags located in the recognition area; recognizing the one or more RFID tags located in the recognition area, based on the signals received by the RFID reader; when the RFID reader receives an RFID signal including an invalidation instruction, which is transmitted from an operation tag located in the recognition area and then if the operation mode is not set to the invalidation enabled mode, setting the operation mode to the invalidation enabled mode; and before or at the time of the setting of the invalidation enabled mode, or after the setting of the invalidation enabled mode and while the operation mode is the invalidation enabled mode, when at least one second authentication tag is recognized, invalidating the at least one second authentication tag, or invalidating all authentication tags that belong to a group to which the at least one second authentication tag belongs.

An authentication registration/invalidation method according to an aspect of the present invention is a method of performing authentication registration and authentication invalidation on the authentication tag by means of the operation tag. The method includes: providing an operation mode storage unit configured to store an operation mode that is set to a registration enabled mode; receiving, with an RFID reader associated with a recognition area, signals transmitted from one or more RFID tags located in the recognition area; recognizing the one or more RFID tags located in the recognition area, based on the signals received by the RFID reader; when the RFID reader receives an RFID signal including a registration instruction, which is transmitted from an operation tag located in the recognition area, and then if the operation mode is not set to the registration enabled mode, setting the operation mode to the registration enabled mode; when the RFID reader receives an RFID signal including an invalidation instruction, which is transmitted from an operation tag located in the recognition area and then if the operation mode is not set to the invalidation enabled mode, setting the operation mode to the invalidation enabled mode; while the operation mode is the registration enabled mode after the setting of the registration enabled mode, when at least one first authentication tag is recognized, regarding the at least one first authentication tag as an operation target so as to make the at least one first authentication tag belong to a certain group by registering the at least one first authentication tag; and before or at the time of the setting of the invalidation enabled mode, or after the setting of the invalidation enabled mode and while the operation mode is the invalidation enabled mode, when at least one second authentication tag is recognized, invalidating the at least one second authentication tag, or invalidating all authentication tags that belong to a group to which the at least one second authentication tag belongs.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE EMBODIMENTS

Hereinafter, an authentication registration/invalidation apparatus according to an embodiment of the present invention will be described with reference to the drawings.

Figure 1:
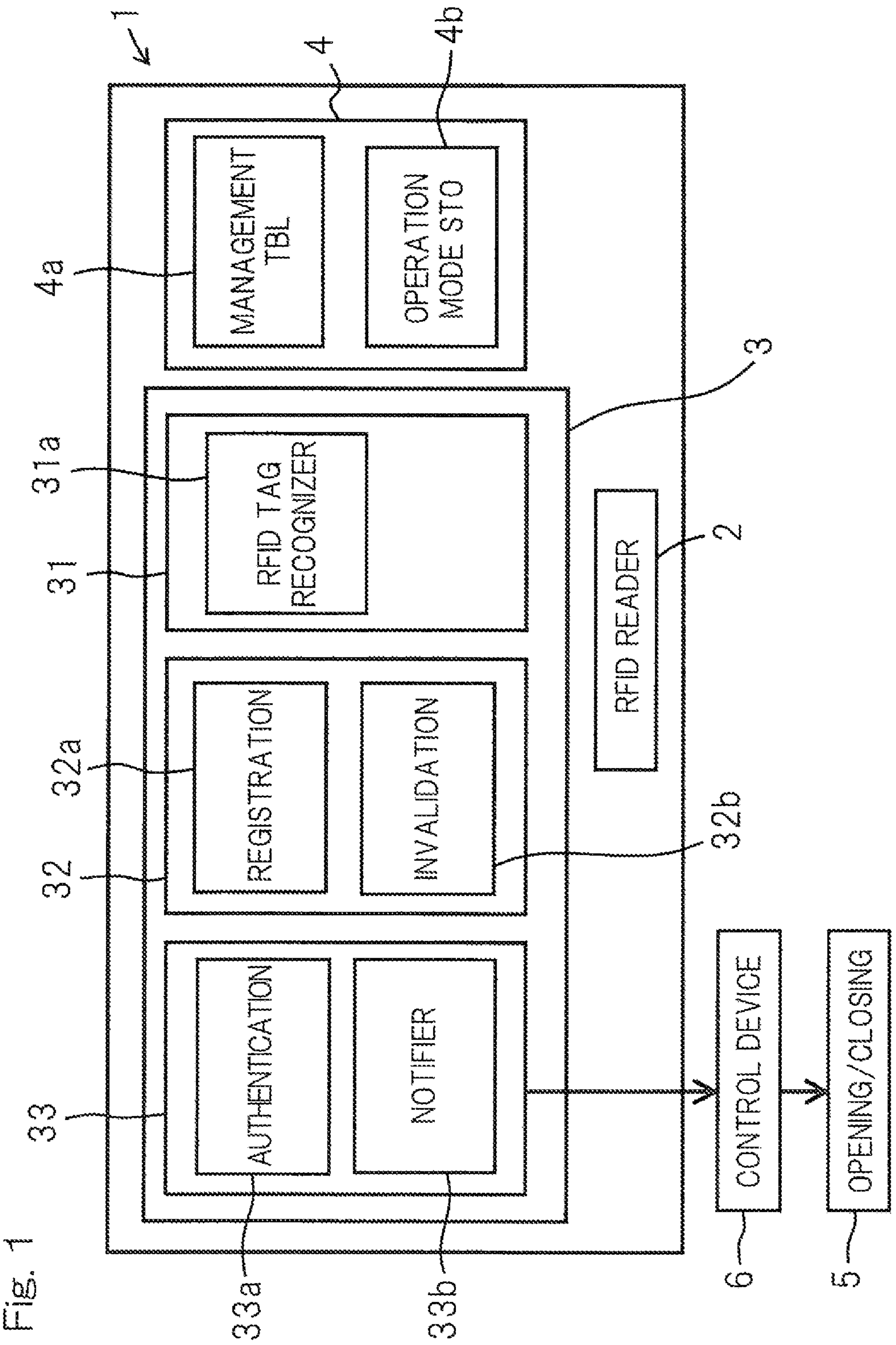
FIG. 1 is a schematic block diagram showing an authentication registration/invalidation apparatus according to an embodiment of the present invention.

FIG. 1 shows an authentication registration/invalidation apparatus 1 according to an embodiment of the present invention. The authentication registration/invalidation apparatus 1 is realized by incorporating a function of authentication registration/invalidation into an authentication apparatus which determines whether or not an RFID tag carried by a person is registered for authentication.

Figure 2:
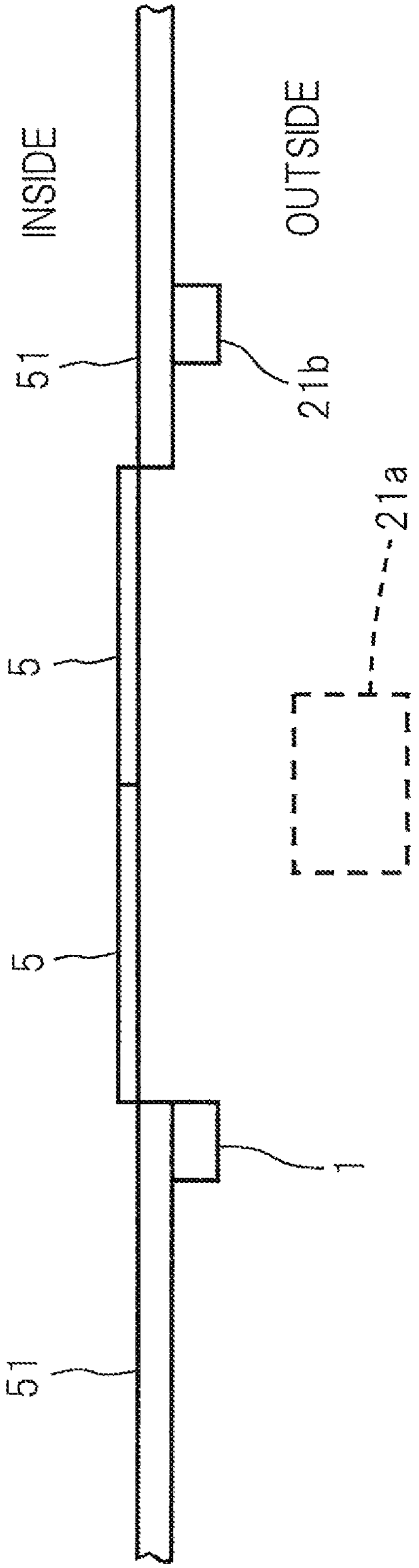
FIG. 2 is a top view showing a peripheral area where the authentication registration/invalidation apparatus according to the embodiment of the present invention is installed.

The authentication registration/invalidation apparatus 1 may be installed in a main entrance of an office building of a company or an entrance of an apartment building. Only when determining that an RFID tag is registered for authentication, the authentication registration/invalidation apparatus 1 allows, through a control device 6, opening of an opening/closing unit such as doors 5 provided in the entrance. As shown in FIG. 2, the authentication registration/invalidation apparatus 1 may be mounted to a wall 51 in the vicinity of automatic sliding doors 5. It is noted that the opening/closing unit 5 may be a shutter or any other member, regardless of whether it is automatic or manual, as long as opening thereof is allowed when authentication succeeds.

Figure 3:
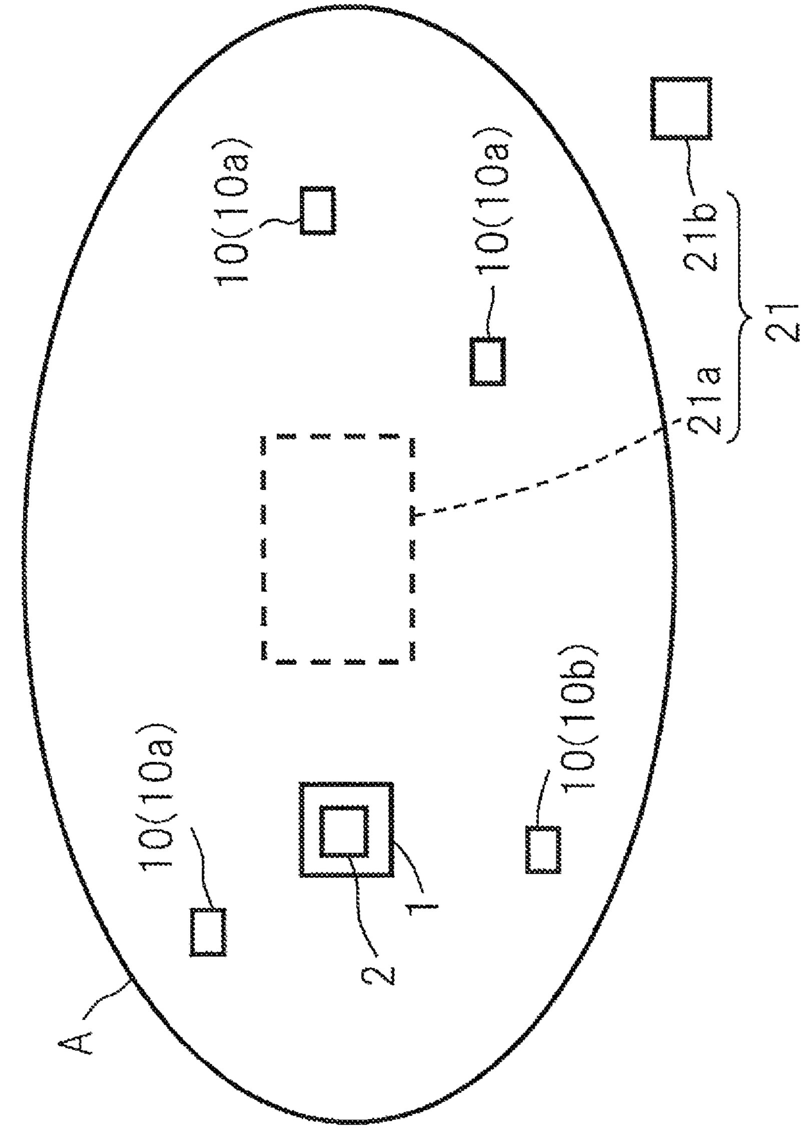
FIG. 3 is a schematic top view showing a recognition area of the authentication registration/invalidation apparatus shown in FIG. 1.

Referring back to FIG. 1, the authentication registration/invalidation apparatus 1 includes an RFID reader 2, a processor 3 and a memory 4. As shown in FIG. 3, the RFID reader 2 receives RFID signals (radio waves) from one or more RFID tags 10 in a recognition area A. In the recognition area A, a plurality of RFID tags 10 can be located. These RFID tags 10 in the recognition area A periodically transmit RFID signals, respectively, and each of the RFID signals includes ID information unique to the corresponding RFID tag 10. It is noted that the recognition area A is an authentication area while the authentication registration/invalidation apparatus 1 acts as an authentication apparatus.

In the present embodiment, each RFID tag 10 is a so-called semi-active type tag which has a built-in battery, and voluntarily transmits a radio wave only in an activation area where it is activated by an activation source.

The RFID tag 10 may be of the semi-active type, and thus, a magnetic field generator 21 is provided which generates a trigger magnetic field that forms the recognition area A. The magnetic field generator 21 is composed of a trigger coil 21*a* and a trigger unit 21*b* that causes the trigger coil 21*a* to generate a magnetic field. As shown in FIG. 2, the trigger coil 21*a* is, for example, embedded in a floor in the vicinity of the doors 5 outside the building, and the trigger unit 21*b* is mounted to the wall 51 and is connected to the trigger coil 21*a* with a wiring (not shown).

In FIG. 3, the RFID tags 10 are classified into either an authentication tag 10*a* or an operation tag 10*b*. Each authentication tag 10*a* is used for authentication. Therefore, an authorized person carries an object to be authenticated, such as an IC card in which an authentication tag 10*a* having been registered for authentication is embedded. However, the object to be authenticated having the RFID tag 10 of the semi-active type, is not limited to a card-shaped object, and may have any shape as long as it is easy to be carried.

Figure 4:
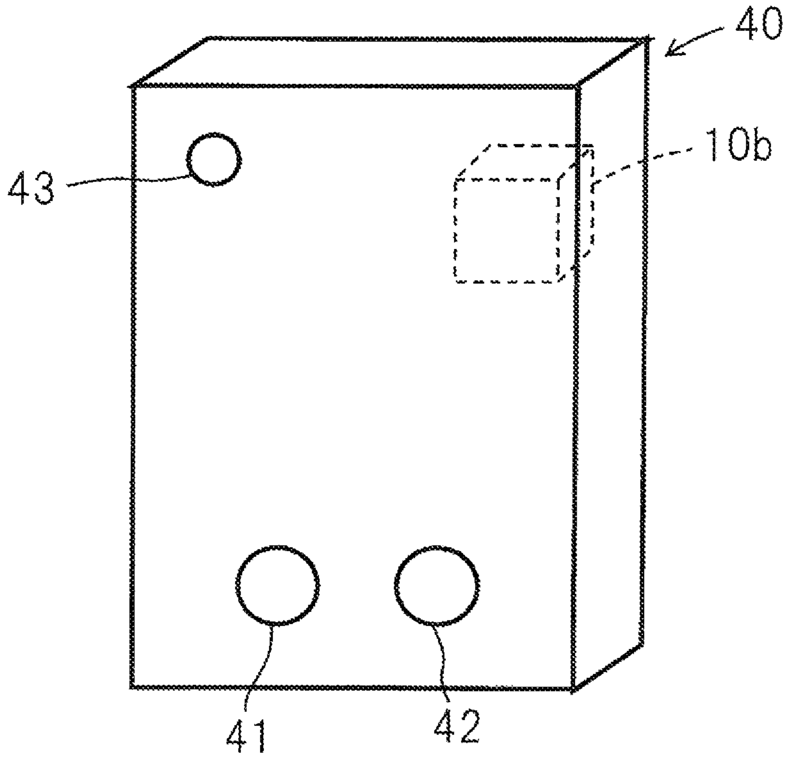
FIG. 4 is a perspective view showing an operation tag to be authenticated by the authentication registration/invalidation apparatus shown in FIG. 1.

As shown in FIG. 4, the operation tag 10*b* is embedded in an instruction device 40 having a size small enough to fit in a human hand, that is, a size suited to be grasped. The instruction device 40 includes a switching button 41 and an instruction button 42. The switching button 41 is a button for switching between registration, invalidation, and termination. When the switching button 41 is pressed, an instruction of the instruction button 42 is switched between registration, invalidation, and termination. The instruction button 42 is a button for instructing setting of a registration enabled mode, setting of an invalidation enabled mode, or termination of the registration enabled mode or the invalidation enabled mode, according to the switching with the switching button 41.

The instruction device 40 may include a notifier 43 such as an LED lamp. The LED lamp 43, by blinking or the like, notifies an operator of the instruction device 40 that the operation performed on the buttons 41 and 42 is executed.

Whether the RFID tag 10 (FIG. 3) is an authentication tag 10*a* or an operation tag 10*b* (FIG. 3) may be determined by the RFID reader 2 (FIG. 1) based on an identifier indicating that the RFID tag 10 is an authentication tag or an operation tag, which is included in an RFID signal transmitted from the RFID tag 10. Accordingly, the operation tag 10*b* included in the instruction device 40 may be a tag which can be both an authentication tag and an operation tag by being switched between the authentication tag and the operation tag with a button (not shown) being pressed. Alternatively, different operation tags 10*b* may be provided as an operation tag for setting the registration enabled mode, an operation tag for setting the invalidation enabled mode, and an operation tag for terminating the registration enabled mode or the invalidation enabled mode.

Referring back to FIG. 1, the processor 3 includes an RFID tag recognition section 31, a registration/invalidation processing section 32 and an authentication processing section 33. Registration/invalidation by the registration/invalidation processing section 32 and authentication by the authentication processing section 33 are not executed simultaneously. In other words, while authentication registration or authentication invalidation is executed, the process of the registration/invalidation processing section 32 is executed. On the other hand, while authentication is performed to allow opening of the opening/closing unit 5, the process of the authentication processing section 33 is executed. The memory 4 includes a management table 4*a*, which is described later, and an operation mode storage unit 4*b*. The operation mode storage unit 4*b* stores an operation mode therein, which can be set to the registration enabled mode or the invalidation enabled mode.

The RFID tag recognition section 31 includes an RFID tag recognizer 31*a*. The RFID tag recognizer 31*a* recognizes all the RFID tags located in the recognition area A (FIG. 2), based on the signals received by the RFID reader 2.

The registration/invalidation processing section 32 includes a registration unit 32*a* and an invalidation unit 32*b*. The registration unit 32*a* registers an authentication tag so as to make the tag belong to a certain group, as described later. The invalidation unit 32*b* invalidates an authentication tag. It is noted that an authentication tag belongs to only a certain group when being registered, and belonging of the authentication tag to the group is canceled when the authentication tag is invalidated.

The authentication processing section 33 includes an authentication unit 33*a* and an authentication notifier 33*b*. The authentication unit 33*a* determines whether or not each of all the RFID tags recognized by the RFID tag recognizer 31*a* is registered, with reference to the management table 4*a*. When the authentication unit 33*a* determines that at least one authentication tag is registered, the authentication notifier 33*b* outputs a signal that allows opening of the doors 5, to the control device 6.

Hereinafter, registration processes and invalidation processes performed by the authentication registration/invalidation apparatus 1 according to the present embodiment will be described. It is noted that the registration processes include not only a process of registering an unregistered authentication tag so as to make the tag belong to a group but also a process of making an already-registered authentication tag belong to another group.

<Registration Process 1>

This registration process is executed, for example, after the authentication registration/invalidation apparatus 1 has been introduced, or when a new family has moved in an apartment building. That is, this registration process is a process of registering an unregistered authentication tag so as to make the tag belong to a new group.

Figure 5:
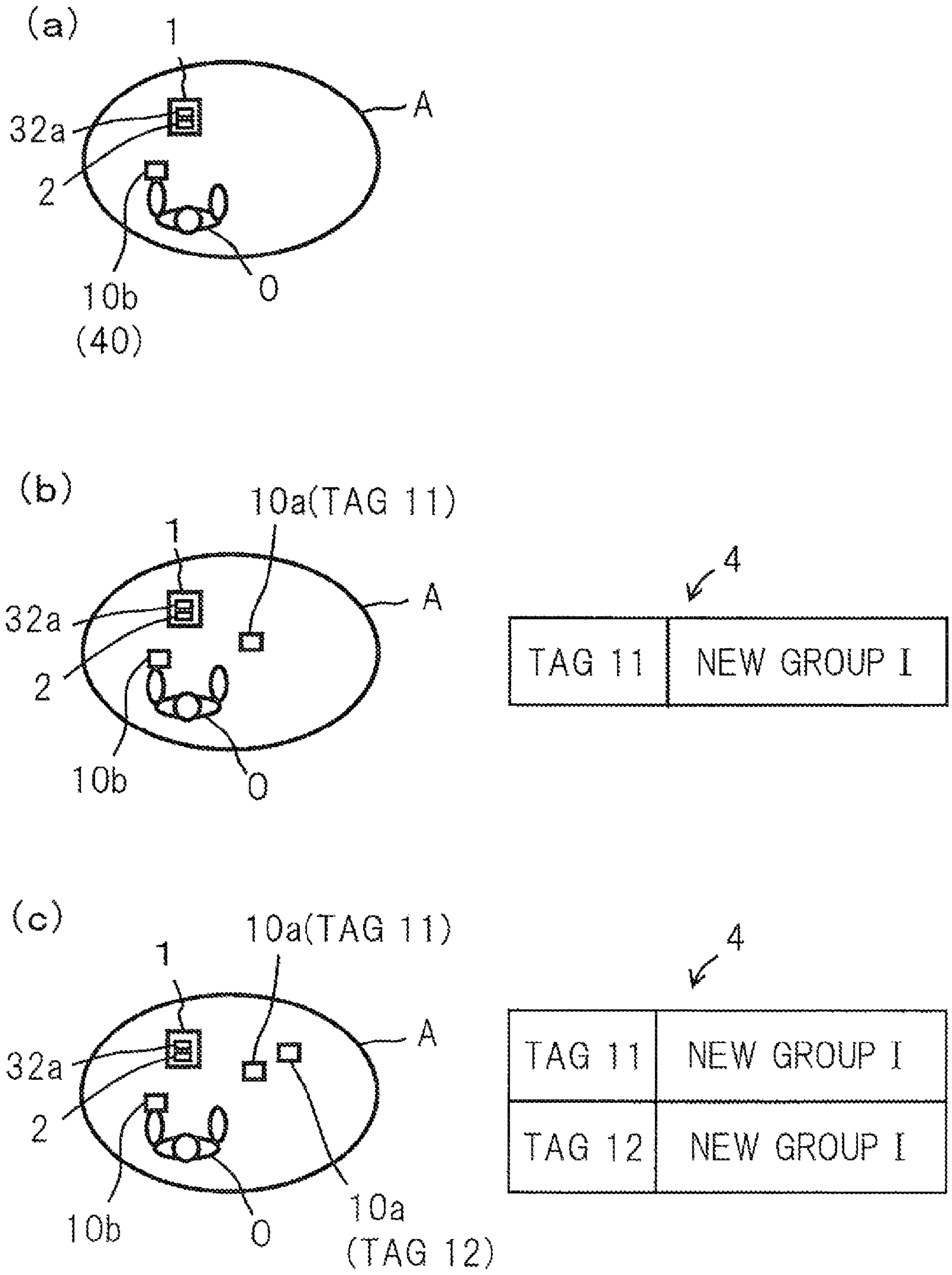
FIGS. 5(*a*) to 5(*c*) are diagrams showing steps of a registration process 1 of the authentication registration/invalidation apparatus according to the embodiment of the present invention, and each figure includes a schematic top view showing the recognition area at the corresponding step, and a diagram showing a management table at the step, according to need.

First, in FIG. 5(*a*), an operator O who performs registration of an authentication tag embedded in an IC card by utilizing the recognition area A knows the place where the trigger coil 21*a* (FIG. 3) is mounted although he/she cannot visually confirm the recognition area A. Therefore, the operator O roughly knows the recognition area A.

The operator O enters the recognition area A with the instruction device 40 in one hand. The operator's entering the recognition area A causes the operation tag 10*b* in the instruction device 40 to be activated by the magnetic field generator 21 (FIG. 3), and the operation tag 10*b* transmits an RFID signal. The RFID signal transmitted at this time point does not include any instructions of registration or invalidation. However, since the operation tag 10*b* transmits the RFID signal at a predetermined time interval, the RFID tag recognizer 31*a* (FIG. 1) recognizes the operation tag 10*b* in the recognition area A.

Next, when the operator O instructs registration by pressing the switching and instruction buttons 41 and 42 (FIG. 4), the instruction of registration is included in the RFID signal transmitted from the operation tag 10*b*. Then, the operation tag 10*b* in the instruction device 40 located in the recognition area A continues to transmit the RFID signal including the instruction of registration at the predetermined time interval.

When the RFID reader 2 receives the RFID signal including the instruction of registration for the first time, the registration unit 32*a* sets the operation mode to the registration enabled mode. It is noted that the operation mode is stored in the operation mode storage unit 4*b*.

Thereafter, during the registration enabled mode, if the operator O moves an IC card having a built-in unregistered authentication tag 10*a* (referred to as "tag 11") into the recognition area A as shown in FIG. 5(*b*), the authentication tag 10*a* (tag 11) is recognized by the RFID tag recognizer 31*a* (FIG. 1). Then, the registration unit 32*a* confirms that the authentication tag 10*a* (tag 11) is not registered with reference to the management table 4*a*, and thereafter, registers the authentication tag 10*a* (tag 11) in association with a new group I, followed by recording on the management table 4*a*.

Then, during the registration enabled mode, if the operator O moves an IC card having another built-in unregistered authentication tag 10*a* (referred to as "tag 12") into the recognition area A as shown in FIG. 5(*c*), the registration unit 32*a* confirms that the authentication tag 10*a* (tag 12) is not registered with reference to the management table 4*a*, similarly to the authentication tag 10*a* (tag 11) of the IC card that has previously been moved into the recognition area A, and then registers the authentication tag 10*a* (tag 12) so as to make the tag 12 belong to the same new group I to which the authentication tag 10*a* (tag 11) that has previously been moved to the recognition area A belongs, followed by recording on the management table 4*a*.

Thereafter, when the operator O instructs termination by pressing the switching and instruction buttons 41 and 42 (FIG. 4), the instruction of registration disappears from the RFID signal transmitted from the operation tag 10*b*, and the registration unit 32*a* terminates the registration enabled mode.

It is noted that when an unregistered authentication tag is registered in another new group, the above-mentioned registration process is again performed after the termination of the registration enabled mode.

<Registration Process 2>

This registration process is executed, for example, when, in an office building, a new employee is hired and assigned to an already existing department, or when, in an apartment, a new housemate is added. That is, this registration process is a process of registering an unregistered authentication tag so as to make the tag belong to an already-existing group.

Figure 6:
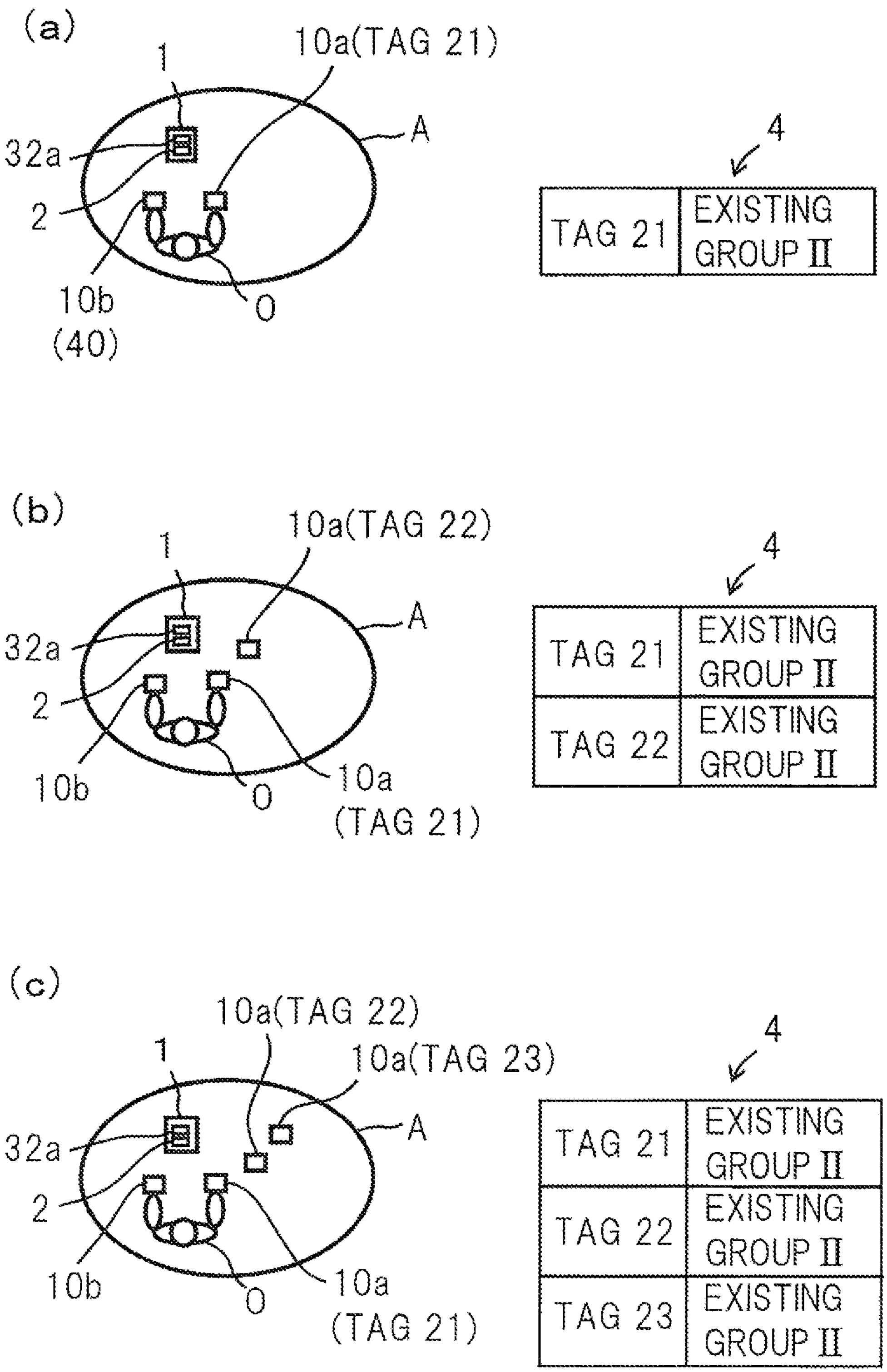
FIGS. 6(*a*) to 6(*c*) are diagrams showing steps of a registration process 2 of the authentication registration/invalidation apparatus according to the embodiment of the present invention, and each figure includes a schematic top view showing the recognition area at the corresponding step, and a diagram showing the management table at the step.

First, in FIG. 6(*a*), an operator O enters the recognition area A with the instruction device 40 in one hand, and an IC card having a built-in already-registered authentication tag 10*a* (referred to as "tag 21") in the other hand. It is assumed that the operator O temporarily borrows the IC card having the built-in already-registered authentication tag 10*a* (tag 21) from a person who usually carries the IC card, and the IC card belongs to an existing group II. The operator's entering the recognition area A causes the operation tag 10*b* in the instruction device 40 and the authentication tag 10*a* (tag 21) to be activated by the magnetic field generator 21 (FIG. 3), and thereby these tags transmit RFID signals. The RFID signal transmitted from the operation tag 10*b* at this time point does not include any instructions.

Next, when the operator O instructs registration by pressing the switching and instruction buttons 41 and 42 (FIG. 4), an instruction of registration is included in the RFID signal transmitted from the operation tag 10*b*. Then, the operation tag 10*b* in the instruction device 40 located in the recognition area A continues to transmit the RFID signal including the instruction of registration at a predetermined time interval.

When the RFID reader 2 receives the RFID signal including the instruction of registration for the first time, the registration unit 32*a* sets the operation mode to the registration enabled mode.

Thereafter, during the registration enabled mode, if the operator O moves an IC card as a registration target having a built-in unregistered authentication tag 10*a* (referred to as "tag 22") as an operation target into the recognition area A as shown in FIG. 6(*b*), the RFID tag recognizer 31*a* (FIG. 1) recognizes the authentication tag 10*a* (tag 22). Then, after the registration unit 32*a* confirms that the authentication tag 10*a* (tag 22) is not registered with reference to the management table 4*a*, the registration unit 32*a* registers the authentication tag 10*a* (tag 22) so as to make the tag 22 belong to the existing group II to which the authentication tag 10*a* (tag 21) belongs, which has existed in the recognition area A since before the setting of the registration enabled mode, followed by recording on the management table 4*a*.

Next, during the registration enabled mode, when the operator O moves an IC card having another built-in unregistered authentication tag 10*a* (referred to as "tag 23") into the recognition area A as shown in FIG. 6(*c*), the registration unit 32*a* confirms that the authentication tag 10*a* (tag 23) is not registered with reference to the management table 4*a*, similarly to the authentication tag 10*a* (tag 22) of the IC card that has previously been moved into the recognition area A, and then registers the authentication tag 10*a* (tag 23) so as to make the tag 23 belong to the existing group II to which the authentication tag 10*a* (tag 21) belongs, which has existed in the recognition area A since before the setting of the registration enabled mode, followed by recording on the management table 4*a*.

Thereafter, when the operator O instructs termination by pressing the switching and instruction buttons 41 and 42 (FIG. 4), the instruction of registration disappears from the RFID signal transmitted from the operation tag 10*b*, and the registration unit 32*a* terminates the registration enabled mode.

It is noted that when an unregistered authentication tag is registered in another existing group, the above-mentioned registration process is again performed after the termination of the registration enabled mode.

<Registration Process 3>

This registration process is executed when, in an office building, an employee is transferred to a newly established department, for example. In other words, this registration process is a process of changing belonging of an already-registered authentication tag that belongs to an existing group from the existing group to a new group while the authentication tag remains registered. Accordingly, this registration process is not a process of registering a new authentication tag but a process of simply changing the group to which an authentication tag belongs.

Figure 7:
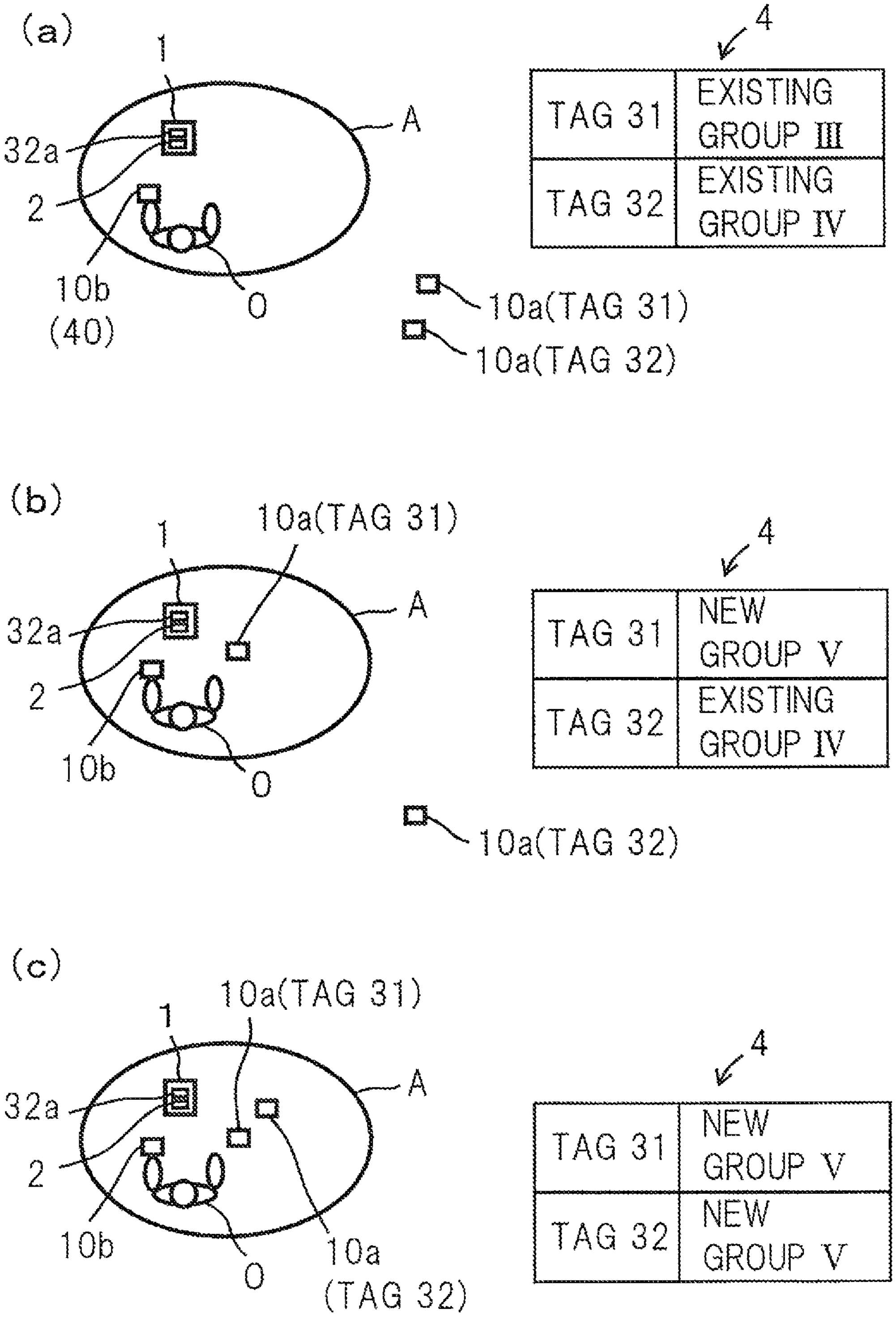
FIGS. 7(*a*) to 7(*c*) are diagrams showing steps of a registration process 3 of the authentication registration/invalidation apparatus according to the embodiment of the present invention, and each figure includes a schematic top view showing the recognition area at the corresponding step, and a diagram showing the management table at the step.

First, in FIG. 7(*a*), an operator O enters the recognition area A with the instruction device 40 in one hand, for example. Thereby, the RFID tag recognizer 31*a* (FIG. 1) recognizes the operation tag 10*b* in the recognition area A.

Next, when the operator O instructs registration by pressing the switching and instruction buttons 41 and 42 (FIG. 4), the operation tag 10*b* in the instruction device 40 located in the recognition area A continues to transmit an RFID signal including an instruction of registration at a predetermined time interval.

When the RFID reader 2 receives the RFID signal including the instruction of registration for the first time, the registration unit 32*a* sets the operation mode to the registration enabled mode.

At this time, it is assumed that an IC card having a built-in already-registered authentication tag 10*a* (referred to as "tag 31") that belongs to an existing group III and an IC card having a built-in already-registered authentication tag 10*a* (referred to as "tag 32") that belongs to an existing group IV, are present outside the recognition area A.

Thereafter, during the registration enabled mode, when the operator O moves the IC card having the built-in already-registered authentication tag 10*a* (tag 31) that belongs to the existing group III into the recognition area A as shown in FIG. 7(*b*), the RFID tag recognizer 31*a* (FIG. 1) recognizes the authentication tag 10*a* (tag 31) located in the recognition area A, and the registration unit 32*a* changes belonging of the authentication tag 10*a* (tag 31) from the existing group III to a new group V, followed by recording on the management table 4*a*.

Next, during the registration enabled mode, when the operator O moves the IC card having the built-in already-registered authentication tag 10*a* (tag 32) into the recognition area A as shown in FIG. 7(*c*), the registration unit 32*a* changes belonging of the authentication tag 10*a* (tag 32) from the existing group IV to the new group V, similarly to the authentication tag 10*a* (tag 31) that has previously been moved into the recognition area A, followed by recording on the management table 4*a*.

Thereafter, when the operator O instructs termination by pressing the switching and instruction buttons 41 and 42 (FIG. 4), the instruction of registration disappears from the RFID signal transmitted from the operation tag 10*b*, and the registration unit 32*a* terminates the registration enabled mode.

It is noted that when belonging of an already-registered authentication tag is changed to another new group, the above-mentioned registration process is again performed after the termination of the registration enabled mode.

<Registration Process 4>

This registration process is executed when, in an office building, an employee is assigned to another existing department. In other words, this registration process is a process of changing belonging of an already-registered authentication tag from a group to which the tag belongs to another existing group. Accordingly, this registration process is not a process of registering a new authentication tag but a process of simply changing the group to which an already-registered authentication tag belongs while the tag remains registered.

Figure 8:
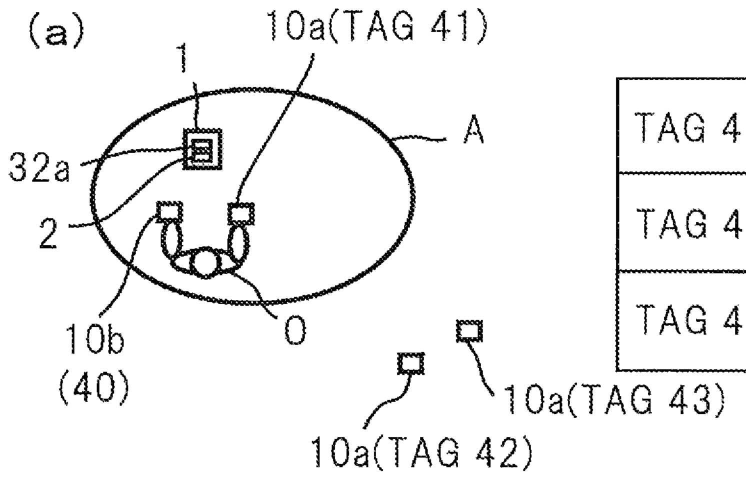
FIGS. 8(*a*) to 8(*c*) are diagrams showing steps of a registration process 4 of the authentication registration/invalidation apparatus according to the embodiment of the present invention, and each figure includes a schematic top view showing the recognition area at the corresponding step, and a diagram showing the management table at the step.
Figure 8:
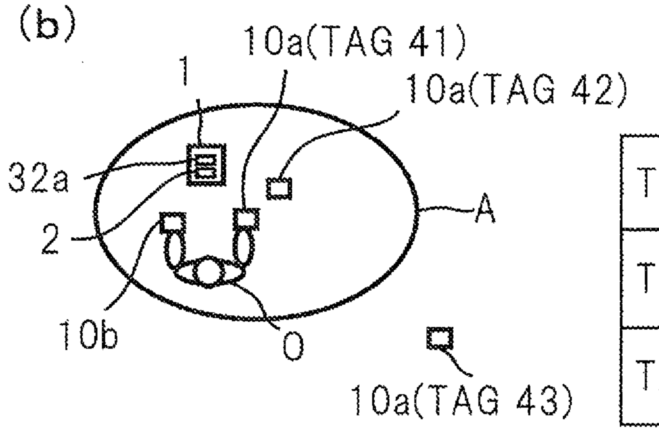
Figure 8:
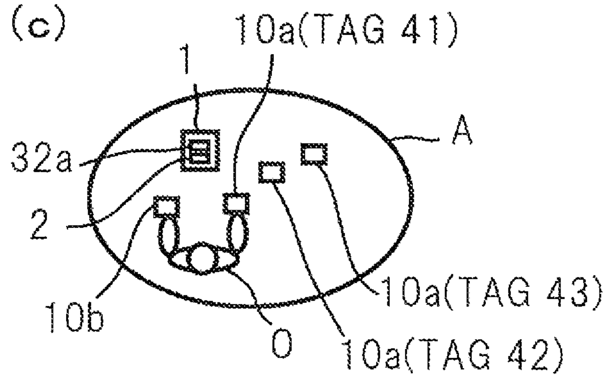

First, in FIG. 8(*a*), an operator O enters the recognition area A with the instruction device 40 in one hand, and an IC card having a built-in already-registered authentication tag 10*a*

(referred to as "tag 41") in the other hand, for example. It is assumed that the operator O temporarily borrows the IC card having the built-in already-registered authentication tag 10*a* (tag 41) from a person who usually carries the IC card, and the IC card belongs to an already-existing group VI.

When the operator O instructs registration by pressing the switching and instruction buttons 41 and 42 (FIG. 4), the operation tag 10*b* in the instruction device 40 located in the recognition area A continues to transmit an RFID signal including an instruction of registration at a predetermined time interval.

When the RFID reader 2 receives the RFID signal including the instruction of registration for the first time, the registration unit 32*a* sets the operation mode to the registration enabled mode.

At this time, it is assumed that an IC card having a built-in already-registered authentication tag 10*a* (referred to as "tag 42") that belongs to an existing group VII and an IC card having a built-in already-registered authentication tag 10*a* (referred to as "tag 43") that belongs to an existing group VIII, are present outside the recognition area A.

Thereafter, during the registration enabled mode, when the operator O moves the IC card as a registration target having the built-in already-registered authentication tag 10*a* (tag 42) as an operation target into the recognition area A as shown in FIG. 8(*b*), the RFID tag recognizer 31*a* (FIG. 1) recognizes the authentication tag 10*a* (tag 42) located in the recognition area A. Then, the registration unit 32*a* changes belonging of the authentication tag 10*a* (tag 42) from the existing group VII to the existing group VI, followed by recording on the management table 4*a*.

Next, during the registration enabled mode, when the operator O moves the IC card as a registration target having the built-in already-registered authentication tag 10*a* (tag 43) as an operation target, into the recognition area A as shown in FIG. 8(*c*), the registration unit 32*a* changes, in the management table 4*a*, belonging of the authentication tag 10*a* (tag 43) from the existing group VIII to the existing group VI, similarly to the authentication tag 10*a* (tag 42) that has previously been moved into the recognition area A, followed by recording on the management table 4*a*.

Thereafter, when the operator O instructs termination by pressing the switching and instruction buttons 41 and 42 (FIG. 4), the instruction of registration disappears from the RFID signal transmitted from the operation tag 10*b*, and the registration unit 32*a* terminates the registration enabled mode.

It is noted that when an already-registered authentication tag is made to belong to another existing group, the above-mentioned registration process should be performed again after the registration enabled mode is terminated.

<Invalidation Process 1>

This invalidation process is executed, for example, when, in an office building, an employee retires, or when, in an apartment, one of housemates leaves the apartment. That is, this invalidation process is a process of invalidating an already-registered authentication tag.

Figure 9:
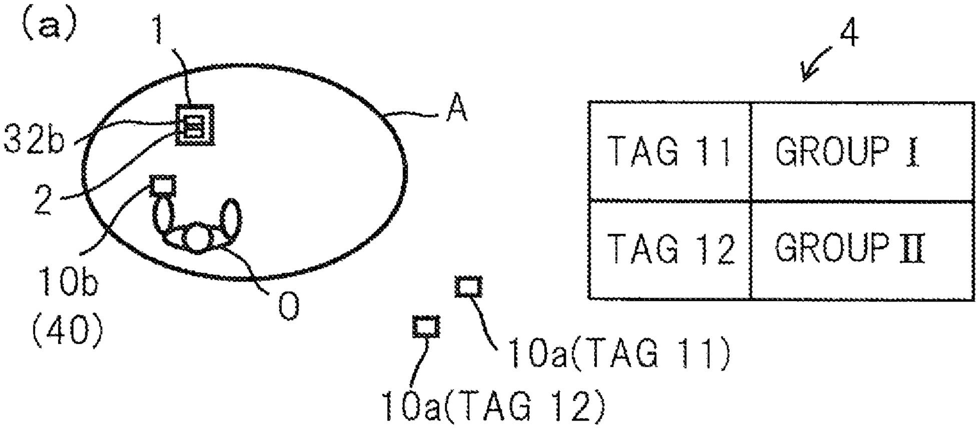
FIGS. 9(*a*) to 9(*c*) are diagrams showing steps of an invalidation process 1 of the authentication registration/invalidation apparatus according to the embodiment of the present invention, and each figure includes a schematic top view showing the recognition area at the corresponding step, and a diagram showing the management table at the step.
Figure 9:
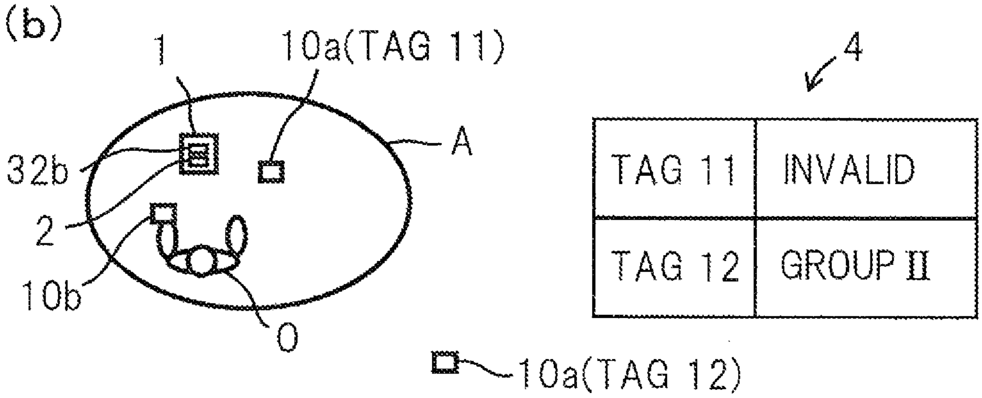
Figure 9:
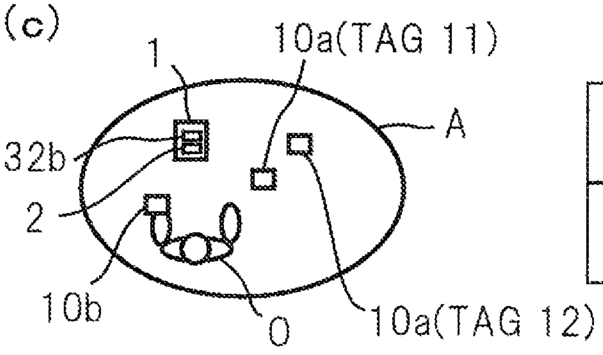

First, in FIG. 9(*a*), an operator O enters the recognition area A with the instruction device 40 in one hand. The operator's entering the recognition area A causes the operation tag 10*b* in the instruction device 40 to be activated by the magnetic field generator 21 (FIG. 3), and the operation tag 10*b* transmits an RFID signal. The RFID signal transmitted at this time point does not include any instructions. However, since the operation tag 10*b* transmits the RFID signal at a predetermined time interval, the RFID tag recognizer 31*a* (FIG. 1) recognizes the operation tag 10*b* in the recognition area A.

Next, when the operator O instructs invalidation by pressing the switching and instruction buttons 41 and 42 (FIG. 4), an instruction of invalidation is included in the RFID signal transmitted from the operation tag 10*b*. Then, the operation tag 10*b* in the instruction device 40 located in the recognition area A continues to transmit the RFID signal including the instruction of invalidation at the predetermined time interval.

When the RFID reader 2 receives the RFID signal including the instruction of invalidation for the first time, the invalidation unit 32*b* sets the operation mode to the invalidation enabled mode.

It is assumed that an IC card having a built-in already-registered authentication tag 10*a* (referred to as "tag 11") that belongs to an existing group I and an IC card having a built-in already-registered authentication tag 10*a* (referred to as "tag 12") that belongs to an existing group II, are present outside the recognition area A.

Thereafter, during the invalidation enabled mode, when the operator O moves the IC card having the built-in already-registered authentication tag 10*a* (tag 11) into the recognition area A as shown in FIG. 9(*b*), the RFID tag recognizer 31*a* (FIG. 1) recognizes the authentication tag 10*a* (tag 11) located in the recognition area A. Then, the invalidation unit 32*b* invalidates or cancels the authentication tag 10*a* (tag 11) and records the invalidation or cancellation on the management table 4*a*, or deletes the record of the authentication tag 10*a* (tag 11) from the management table 4*a*. It is noted that when the authentication tag 10*a* is invalidated, belonging of the tag 10*a* to the existing group is also canceled.

Next, during the invalidation enabled mode, when the operator O moves the IC card having the built-in already-registered authentication tag 10*a* (tag 12) into the recognition area A as shown in FIG. 9(*c*), the invalidation unit 32*b* invalidates the authentication tag 10*a* (tag 12) and records the invalidation on the management table 4*a*, or deletes the record of the authentication tag 10*a* (tag 12) from the management table 4*a*, similarly to the authentication tag 10*a* (tag 11) that has previously been moved into the recognition area A.

Thereafter, when the operator O instructs termination by pressing the switching and instruction buttons 41 and 42 (FIG. 4), the instruction of invalidation disappears from the RFID signal transmitted from the operation tag 10*b*, and the invalidation unit 32*b* terminates the invalidation enabled mode.

<Invalidation Process 2>

This invalidation process is executed, for example, when an already-registered authentication card is lost, or when a tenant or a family leaves an apartment building. In other words, this invalidation process is a process of invalidating all authentication tags that belong to a group to which an already-registered authentication tag belongs, by using the already-registered authentication tag.

Figure 10:
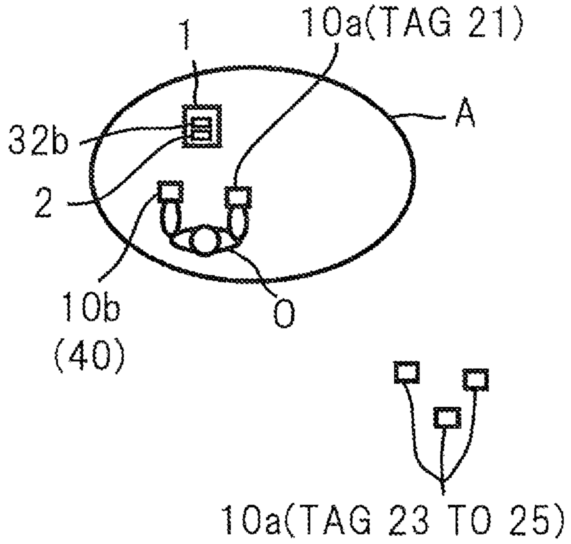
FIGS. 10(*a*) to 10(*b*) are diagrams showing steps of an invalidation process 2 of the authentication registration/invalidation apparatus according to the embodiment of the present invention, and each figure includes a schematic top view showing the recognition area at the corresponding step, and a diagram showing the management table at the step.
Figure 10:
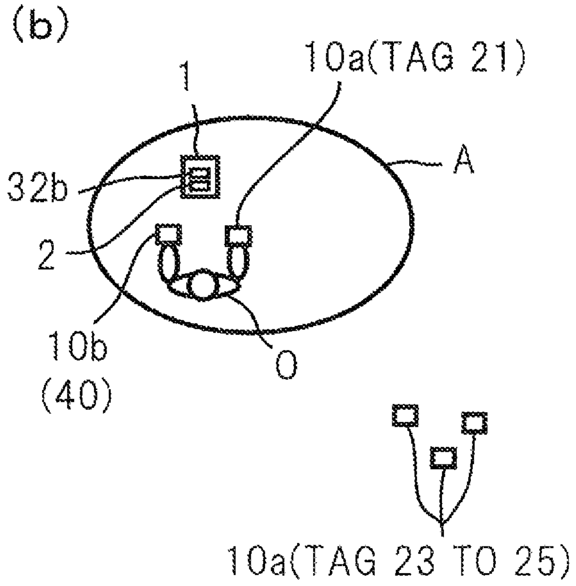

First, in FIG. 10(*a*), an operator O enters the recognition area A, with the instruction device 40 in one hand, and an IC card having a built-in authentication tag 10*a* (referred to as "tag 21") which belongs to a group III to which a lost already-registered authentication tag belongs, in the other hand. It is noted that the operator O temporarily borrows the authentication tag 10*a* (tag 21) from a person who usually carries the tag. In addition, it is assumed that the lost authentication tag 10*a* (referred to as "tag 22") and other authentication tags 10*a* (referred to as "tags 23 to 25") belong to the group III to which the authentication tag 10*a* (tag 21) belongs.

The operator's entering the recognition area A causes the operation tag 10*b* in the instruction device 40 and the authentication tag 10*a* (tag 21) to be activated by the magnetic field generator 21 (FIG. 3), and these tags transmit RFID signals.

The RFID signal transmitted from the operation tag 10*b* at this time point does not include any instructions.

Next, in FIG. 9(*b*), when the operator O instructs invalidation by pressing the switching and instruction buttons 41 and 42 (FIG. 4), an instruction of invalidation is included in the RFID signal transmitted from the operation tag 10*b*. At this time, since the RFID tag recognizer 31*a* (FIG. 1) recognizes the authentication tag 10*a* (tag 21) located in the recognition area A, the invalidation unit 32*b* invalidates all the authentication tags 10*a* (tags 21 to 25) that belong to the group III to which the authentication tag 10*a* (tag 21) belongs, and records the invalidation on the management table 4*a* or deletes the record of the invalidated tags 10*a* (tags 21 to 25) from the management table 4*a*. It is noted that, simultaneously with the invalidation of the authentication tags 10*a* (tags 21 to 25), belongings of these tags to the existing group III are canceled, and the group III is also invalidated.

Thereafter, when the operator O instructs termination by pressing the switching and instruction buttons 41 and 42 (FIG. 4), the instruction of invalidation disappears from the RFID signal transmitted from the operation tag 10*b*, and the invalidation unit 32*b* terminates the invalidation enabled mode.

If the authentication tag 10*a* (tag 22) is lost, all the authentication tags 10*a* (tags 21 to 25) that belong to the group to which the lost authentication tag 10*a* (tag 22) belongs are invalidated by the invalidation process 2. Accordingly, if the number of authentication tags 10*a* that belong to the group III is not too great, it is possible to easily invalidate the lost authentication tag 10*a* while minimizing the influence by the invalidation. After all the authentication tags 10*a* (tags 21 to 25) in the group III are invalidated, the invalidated authentication tags 10*a* (tags 21 to 25) are registered so as to belong to a new group, according to the above-mentioned registration process 1, i.e., the process of registering an unregistered authentication tag so as to make the tag belong to a new group.

As described above, according to the authentication registration/invalidation apparatus of the present invention, even if an authentication tag is lost, the authentication tag can be easily invalidated, and furthermore, management of authentication tags can be facilitated.

In the present embodiment, whether the authentication tags 10*a* (the tags 11 and 12 in FIG. 5(*c*) or the tags 31 and 32 in FIG. 7(*c*)) are registered so as to belong to a new group like in the above-mentioned registration process 1 or 3, or the authentication tags 10*a* (the tags 22 and 23 in FIG. 6(*c*) or the tags 42 and 43 in FIG. 8(*c*)) are registered so as to belong to an existing group like in the above-mentioned registration process 2 or 4, depends on when the authentication tags 10*a* are recognized, before or after setting of the registration enabled mode. However, registration of the authentication tags 10*a* may not depend on the above-mentioned order, i.e., the order of setting of the registration enabled mode and recognition of the authentication tag 10*a*.

For example, the instruction of registration may include two types of instructions, i.e., an instruction of registration to a new group and an instruction of registration to an existing group. Further, the instructions may be sub-divided into four types of instructions as follows: an instruction of registration of an unregistered authentication tag to a new group; an instruction of registration of an already-registered authentication tag to a new group; an instruction of registration of an unregistered authentication tag to an existing group; and an instruction of registration of an already-registered authentication tag to an existing group. When the four instructions are included, there may be a situation in which whether an authentication tag that is an operation target is unregistered or already registered does not match an instruction. In this case, the instruction device 40 notifies the operator of this mismatch.

Likewise, in the present embodiment, whether only the recognized authentication tags 10*a* (the tags 11 and 12 in FIG. 9(*c*)) are invalidated as in the invalidation process 1, or all the authentication tags 10*a* (the tags 21 to 25 in FIG. 10(*c*)) that belong to a group to which the recognized authentication tag 10*a* belongs are invalidated as in the invalidation process 2, depends on when the authentication tags 10*a* are recognized, before or after setting of the invalidation enabled mode. In contrast, invalidation of the authentication tag 10*a* may not depend on the above-mentioned order, i.e., the order of setting of the invalidation enabled mode and recognition of the authentication tag 10*a*. For example, the instruction of invalidation may include two types of instructions, i.e., an instruction of invalidation of only a recognized authentication tag and an instruction of invalidation of all authentication tags that belong to a group to which the recognized authentication tag belongs.

When there are a plurality of registration instructions and invalidation instructions as described above, the instruction device 40 (FIG. 4) may be provided with a plurality of individual buttons corresponding to the respective instructions. Accordingly, when there are four registration instructions and two invalidation instructions, for example, the instruction device 40 (FIG. 4) may be provided with six buttons in total. Alternatively, six types of instruction modes may be realized by a single button capable of mode switching.

While in the above-mentioned embodiment the RFID tag 10 is of the semi-active type, the RFID tag 10 may be of a so-called passive type having no built-in battery, or a so-called active type having a built-in battery and voluntarily transmitting a radio wave.

Furthermore, registration and invalidation may be each executed such that a provisional registration or invalidation state is temporarily set according to a provisional registration or invalidation instruction, and thereafter, is shifted to a definitive registration or invalidation state. In particular, the invalidation process 1 is started in the state where no authentication tag 10*a* is present in the recognition area A as shown in FIG. 9(*a*). However, if the operator O executes not the invalidation process 1 but the invalidation process 2 by mistake without noticing that an authentication tag 10*a* is present in the recognition area A, all authentication tags 10*a* in a group to which the authentication tag 10*a* belongs are invalidated. Such erroneous invalidation can be minimized by temporarily setting the provisional invalidation state according to the provisional invalidation instruction and then shifting to the definitive invalidation state.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

1: Authentication registration/invalidation apparatus
2: RFID reader
10: RFID tag
10*a*: Authentication tag

10*b*: Operation tag
31*a*: RFID tag recognizer
32*a*: Registration unit
32*b*: Invalidation unit
A: Recognition area

What is claimed is:

1. An authentication registration/invalidation apparatus which, using RFID tags including an authentication tag and an operation tag, performs authentication registration or authentication invalidation on the authentication tag by means of the operation tag, the apparatus comprising:

an operation mode storage unit configured to store an operation mode that is set to a registration enabled mode or an invalidation enabled mode;

an RFID reader associated with a recognition area, and configured to receive signals transmitted from one or more RFID tags located in the recognition area;

an RFID tag recognizer configured to recognize the one or more RFID tags located in the recognition area, based on the signals received by the RFID reader;

a registration unit configured to operate such that when the RFID reader receives an RFID signal including a registration instruction, which is transmitted from an operation tag located in the recognition area, and then if the operation mode is not set to the registration enabled mode, the registration unit sets the operation mode to the registration enabled mode, and while the operation mode is the registration enabled mode after the setting of the registration enabled mode, when the RFID tag recognizer recognizes at least one first authentication tag, the registration unit regards the at least one first authentication tag as an operation target so as to make the at least one first authentication tag belong to a certain group by registering the at least one first authentication tag;

an invalidation unit configured to operate such that when the RFID reader receives an RFID signal including an invalidation instruction, which is transmitted from the operation tag located in the recognition area, and then if the operation mode is not set to the invalidation enabled mode, the invalidation unit sets the operation mode to the invalidation enabled mode, and before or at the time of the setting of the invalidation enabled mode, or after the setting of the invalidation enabled mode and while the operation mode is the invalidation enabled mode, if the RFID tag recognizer recognizes at least one second authentication tag, the invalidation unit invalidates the at least one second authentication tag or invalidates all authentication tags that belong to a group to which the at least one second authentication tag belongs, an authentication unit configured to determine whether or not an authentication tag, among one or more RFID tags recognized by the RFID tag recognizer, is registered for authentication, based on whether the authentication tag has been subjected to authentication registration by the registration unit or subjected to authentication invalidation by the invalidation unit; and an authentication notifier configured to, when the authentication unit determines that the authentication tag is registered for authentication, output the result of the determination.

2. The authentication registration/invalidation apparatus as claimed in claim 1, wherein whether the invalidation unit invalidates the at least one second authentication tag or all the authentication tags that belong to the group to which the at least one second authentication tag belongs, depends on whether the at least one second authentication tag is recognized by the RFID tag recognizer before or at the time of the setting of the invalidation enabled mode, or after the setting of the invalidation enabled mode and while the operation mode is the invalidation enabled mode.

3. The authentication registration/invalidation apparatus as claimed in claim 2, wherein when the RFID tag recognizer recognizes at least one second already-registered authentication tag before or at the time of the setting of the invalidation enabled mode, the invalidation unit invalidates all authentication tags that belong to a group to which the at least one second already-registered authentication tag belongs, and when the RFID tag recognizer recognizes the at least one second already-registered authentication tag after the setting of the invalidation enabled mode and while the operation mode is the invalidation enabled mode, the invalidation unit invalidates the at least one second already-registered authentication tag.

4. The authentication registration/invalidation apparatus as claimed in claim 3, wherein in the case where the at least one second already-registered authentication tag is recognized before or at the time of the setting of the invalidation enabled mode, the invalidation unit sets the operation mode to the invalidation enabled mode in either a case where the at least one second already-registered authentication tag includes only one tag or a case where the at least one second already-registered authentication tag includes a plurality of tags that belong to the same group.

5. The authentication registration/invalidation apparatus as claimed in claim 1, wherein depending on whether or not the first already-registered authentication tag different from authentication tag(s) that is to be registered as the operation target is recognized by the RFID tag recognizer before or at the time of the setting of the registration enabled mode, the certain group to which, by the registration unit, the authentication tag(s) that is to be registered as the operation target is made to belong is either a group to which the first already-registered authentication tag belongs, or a new group.

6. The authentication registration/invalidation apparatus as claimed in claim 5, wherein if the RFID tag recognizer does not recognize the first already-registered authentication tag before or at the time of the setting of the registration enabled mode, and when the RFID tag recognizer recognizes at least one first unregistered authentication tag that is regarded as the operation target, the registration unit makes the at least one first unregistered authentication tag belong to a new group, if the RFID tag recognizer recognizes the first already-registered authentication tag before or at the time of the setting of the registration enabled mode, and when the RFID tag recognizer recognizes at least one second unregistered authentication tag that is regarded as the operation target, the registration unit makes the at least one second unregistered authentication tag belong to a group to which the first already-registered authentication tag belongs, if the RFID tag recognizer does not recognize the first already-registered authentication tag before or at the time of the setting of the registration enabled mode, and when the RFID tag recognizer recognizes at least one third already-registered authentication tag that is regarded as the operation target, the registration unit cancels belonging of the at least one third already-registered authentication tag to a group to which the tag belongs at that time, and makes the at least one third already-registered authentication tag belong to a new group, and if the RFID tag recognizer recognizes the first already-registered authentication tag before or at the time of the setting of the registration enabled mode, and when the RFID tag recognizer recognizes at least one fourth already-registered authentication tag that is regarded as the operation target, the registration unit cancels belonging of the at least one fourth already-registered authentication tag to a group to which the tag belongs to at that time, and makes the at least one fourth already-registered authentication tag belong to a group to which the first already-registered authentication tag belongs.

7. The authentication registration/invalidation apparatus as claimed in claim 6, wherein in the case where the RFID tag recognizer recognizes the first already-registered authentication tag before or at the time of the setting of the registration enabled mode, the registration unit sets the operation mode to the registration enabled mode in either a case where the first already-registered authentication tag recognized by the RFID tag recognizer before or at the time of the setting of the registration enabled mode includes only one tag or a case where the first already-registered authentication tag includes a plurality of tags that belong to the same group.

8. The authentication registration/invalidation apparatus as claimed in claim 1, wherein when the authentication notifier outputs the result, opening of an opening/closing unit is allowed.

9. The authentication registration/invalidation apparatus as claimed in claim 1, wherein the operation tag is composed of a single operation tag.

10. The authentication registration/invalidation apparatus as claimed in claim 1, wherein each RFID tag is of a semi-active type.

* * * * *